US009294985B2

(12) United States Patent
Vendrow et al.

(10) Patent No.: US 9,294,985 B2
(45) Date of Patent: *Mar. 22, 2016

(54) BRIDGE LINE APPEARANCE FOR LOCATION-AWARE MOBILE DEVICES

(71) Applicant: RingCentral, Inc., San Mateo, CA (US)

(72) Inventors: Vlad Vendrow, Redwood Shores, CA (US); Bruce Young, San Jose, CA (US); Praful Shah, Los Altos Hills, CA (US); Boris Elpiner, Sunnyvale, CA (US); Vladimir Shmunis, South Lake Tahoe, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,025

(22) Filed: Dec. 1, 2014

(65) Prior Publication Data

US 2015/0087319 A1 Mar. 26, 2015

Related U.S. Application Data

(63) Continuation of application No. 14/047,870, filed on Oct. 7, 2013, now Pat. No. 8,934,883, which is a continuation of application No. 12/620,642, filed on Nov. 18, 2009, now Pat. No. 8,611,879.

(60) Provisional application No. 61/117,527, filed on Nov. 24, 2008.

(51) Int. Cl.
*H04M 3/42* (2006.01)
*H04W 40/20* (2009.01)
*H04M 3/46* (2006.01)
(Continued)

(52) U.S. Cl.
CPC .......... *H04W 40/20* (2013.01); *H04M 3/42348* (2013.01); *H04M 3/46* (2013.01);
(Continued)

(58) Field of Classification Search
CPC ..... H04L 63/1408; H04L 3/2281; H04L 3/51; H04L 2203/2044; H04L 3/42127; H04L 3/42212; H04L 3/4234
USPC ......... 455/415, 466, 417, 567, 445, 459, 461, 455/463; 379/201.01, 201.1, 211.01
See application file for complete search history.

(56) References Cited

U.S. PATENT DOCUMENTS 6,038,451 A * 3/2000 Syed et al. .................... 455/445
6,647,107 B1 * 11/2003 Horrer ...................... 379/214.01
(Continued)

OTHER PUBLICATIONS

International Search Report/Written Opinion in PCT/US2009/065055, mailed Jul. 1, 2010, 9 pages.
(Continued)

*Primary Examiner* — Nathan Mitchell
*Assistant Examiner* — Dung Lam
(74) *Attorney, Agent, or Firm* — Fish & Richardson P.C.

(57) ABSTRACT

A vPBX server manages calls in a bridged line appearance (BLA) group. A BLA group can include extensions for location-aware mobile devices. The vPBX server contains location based forwarding rules that can be applied together with BLA redirection rules in managing incoming calls. A single extension can appear as a user interface element (e.g., an icon or button) on multiple mobile devices. Using the user interface element, a primary user can view a secondary user's status, including the secondary user's location information. The vPBX server allows the primary user to redirect the incoming calls to devices in accordance with the forwarding rules and the redirection rules.

16 Claims, 12 Drawing Sheets

(51) Int. Cl.
*H04W 4/16* (2009.01)
*H04M 3/54* (2006.01)
*H04W 64/00* (2009.01)
*H04M 7/00* (2006.01)

(52) U.S. Cl.
CPC ............... *H04M 3/546* (2013.01); *H04W 4/16* (2013.01); *H04W 64/00* (2013.01); *H04M 3/42314* (2013.01); *H04M 7/006* (2013.01); *H04M 2203/1091* (2013.01); *H04M 2203/2044* (2013.01)

(56) References Cited

U.S. PATENT DOCUMENTS

| | | | |
|---|---|---|---|
| 7,006,833 B1 * | 2/2006 | Contractor | 455/456.1 |
| 8,611,879 B2 | 12/2013 | Vendrow et al. | |
| 2002/0132638 A1 * | 9/2002 | Plahte et al. | 455/555 |
| 2003/0095541 A1 | 5/2003 | Chang et al. | |
| 2004/0202300 A1 | 10/2004 | Cooper et al. | |
| 2008/0032716 A1 | 2/2008 | Forte | |
| 2008/0037763 A1 | 2/2008 | Shaffer et al. | |
| 2008/0051066 A1 | 2/2008 | Bandhole et al. | |
| 2009/0022285 A1 * | 1/2009 | Swanburg et al. | 379/88.11 |
| 2010/0130228 A1 | 5/2010 | Vendrow et al. | |
| 2014/0038576 A1 | 2/2014 | Vendrow et al. | |

OTHER PUBLICATIONS

International Preliminary Report on Patentability in PCT/US2009/065055, mailed Jun. 3, 2011, 6 pages.

* cited by examiner

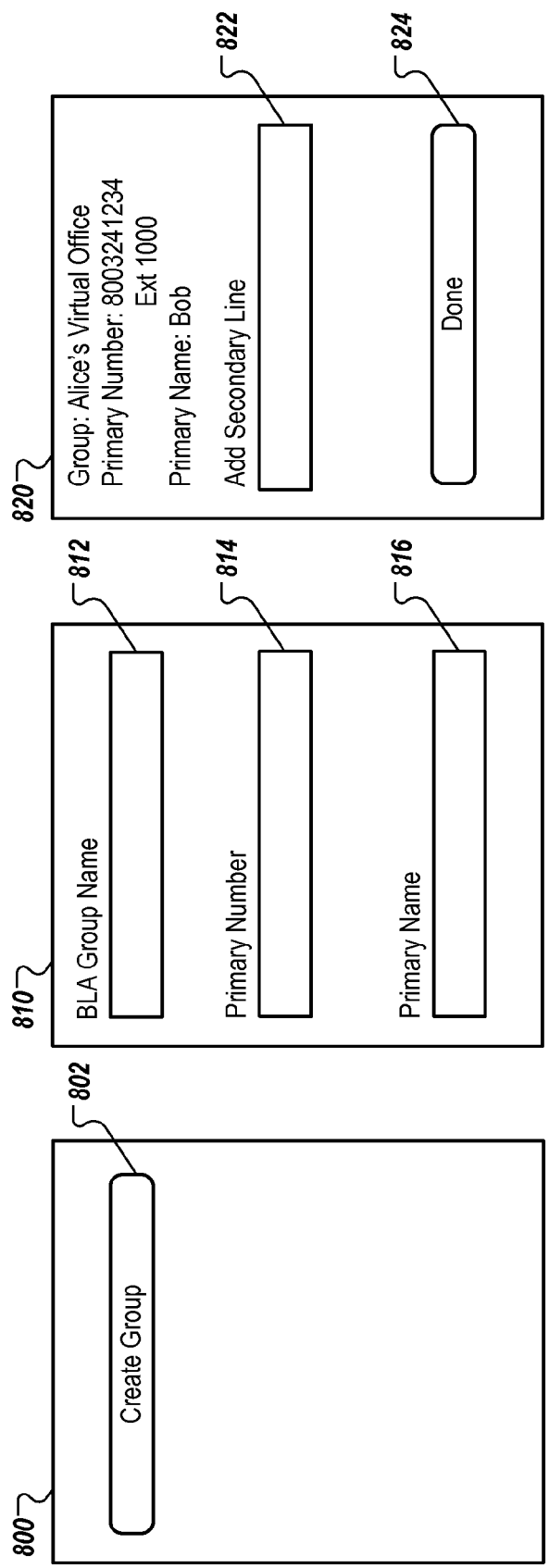

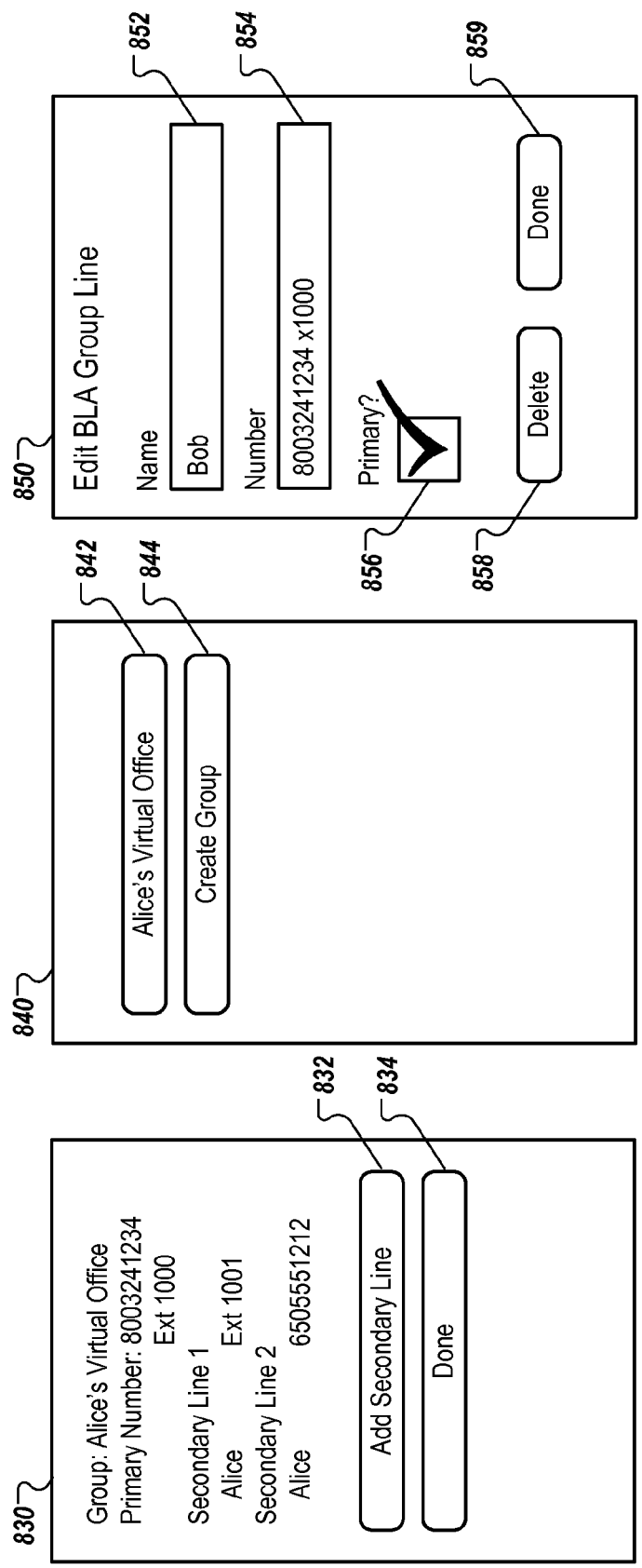

BRIDGE LINE APPEARANCE FOR LOCATION-AWARE MOBILE DEVICES

CROSS-REFERENCE TO RELATED APPLICATIONS

This application is a continuation of U.S. application Ser. No. 14/047,870, filed on Oct. 7, 2013, which is a continuation of U.S. application Ser. No. 12/620,642, filed on Nov. 18, 2009 (now U.S. Pat. No. 8,611,879), which claims priority to U.S. Provisional Application No. 61/117,527, filed on Nov. 24, 2008. The disclosures of the prior applications are considered part of and are incorporated by reference in the disclosure of this application.

TECHNICAL FIELD

This subject matter relates to managing calls for mobile devices.

BACKGROUND

A private branch exchange (PBX) is a telephone network that serves a business or an office. A virtual PBX (vPBX) allows a business or office to be served by a PBX system hosted on remote servers. The service is provided through a combined voice network (e.g. telephone network) and data network (e.g. Internet). A vPBX typically involves one or more voice-over-IP ("VOIP") servers, a call management program, a network, a gateway that links the voice network and data network, and one or more extensions. The extensions can be telephones that connect to the network. A Bridged Line Appearance (BLA) is a technology that permits a telephone number to appear on more than one telephone.

People are increasingly using virtual office technologies to assist their daily work. In a virtual office, a person can work anywhere, and is not limited to a traditional physical office. In a virtual office setting, it can be important to route and control phone calls based on the location of a person. A vPBX server can be used to locate the person. A vPBX server can locate a person by, for example, locating the person's terminal, if the terminal is a mobile device. In a conventional vPBX system, the servers and gateways are usually unaware of the geographical location of the terminals and thus are not well suited to routing and controlling calls based on geographic locations of mobile devices connected to the vPBX system.

SUMMARY

In some implementations, a vPBX server manages calls in a bridged line appearance ("BLA") group. The vPBX server contains location based forwarding rules that can be applied together with BLA redirection rules in managing incoming calls. A single extension can appear as a user interface element (e.g., an icon or button) on multiple mobile devices. Using the user interface element, a primary user can view a secondary user's status, including the secondary user's location information. The vPBX server allows the primary user to redirect the incoming calls to devices in accordance with the forwarding rules and the redirection rules.

In some implementations, a vPBX system implements BLA on mobile devices. In the vPBX system, one or more extension numbers are assigned to devices such as landline phones, virtual voicemail recorders, fax machines, and mobile phones. An extension number can be monitored by multiple user agents as an appearance on a mobile device. A user can specify a group of mobile devices as user agents to monitor an extension number. A group of mobile devices can have dispatching rules based on a group hierarchy and location-based status of the mobile devices. The vPBX system routes phone calls to an extension based on the dispatching rules of the group. The dispatch rules can be associated with geographic locations of location-aware mobile devices. A completely decentralized office can be created using only a set of mobile devices.

The details of one or more implementations of call management of location-aware mobile devices are set forth in the accompanying drawings and the description below. Other features, objects, and advantages of the techniques will be apparent from the description and drawings, and from the claims.

DESCRIPTION OF DRAWINGS

FIGS. 8A-8F show an example user interface for adding and editing a virtual call group from a mobile device.

Like reference symbols in the various drawings indicate like elements.

DETAILED DESCRIPTION

With BLA, a single extension or line identity can appear as a user interface element (e.g., icon or a button) on multiple mobile devices. Using the user interface element, a user can view call status information, answer incoming calls on multiple lines, place the incoming calls on hold, and make outgoing calls on multiple lines associated with multiple extensions, all from a single mobile device. One example use for BLA is to enable efficient call management among a small group of people, e.g., to enable an assistant to efficiently support and manage the call flow for one or more managers in a call group. The implementation of BLA for vPBX and location-aware mobile devices allows the creation of virtual offices that are sensitive to a user's physical presence at certain locations. This BLA technology can also be used by families for more effective communication among family members.

Terminology

A private branch exchange ("PBX") is a telephone network that serves a business or office, in contrast to a common carrier. A PBX system can include one or more VOIP servers, a call management program, and a gateway between a data and voice network. A virtual PBX (vPBX) system is a PBX system whose VOIP servers, call management program, and gateway are located remotely from the office or business, typically at a vPBX service provider. A mobile device is a portable computer device that can wirelessly connect to a data network or a voice network or both. A mobile device typically has a display screen or a keyboard, or both. A mobile device can be a cell phone, a personal digital assistant (PDA), a handheld device, a smart phone, a location aware device and the like. An extension is a device, such as a mobile device or landline phone, that is connected to a PBX system. The PBX system operates as a switchboard for the extensions. A user is a person who uses the vPBX system. A call is a connection between a calling party and a called party over a network. The network can include a voice network, a data network, or both. A caller, or calling party, is a person or device who initiates a call. A callee, or called party, is a person or device who receives a call. A bridged line appearance, also known as shared line appearance, is a technology that enables a user or device who is not a callee to intercept an incoming call to a callee and receive the call on the callee's behalf. An appearance, in the context of bridged line appearance, is the display of the callee's extension and other related information on another device (e.g., as an icon or button on multiple devices).

Call Management System Overview

Figure 1:
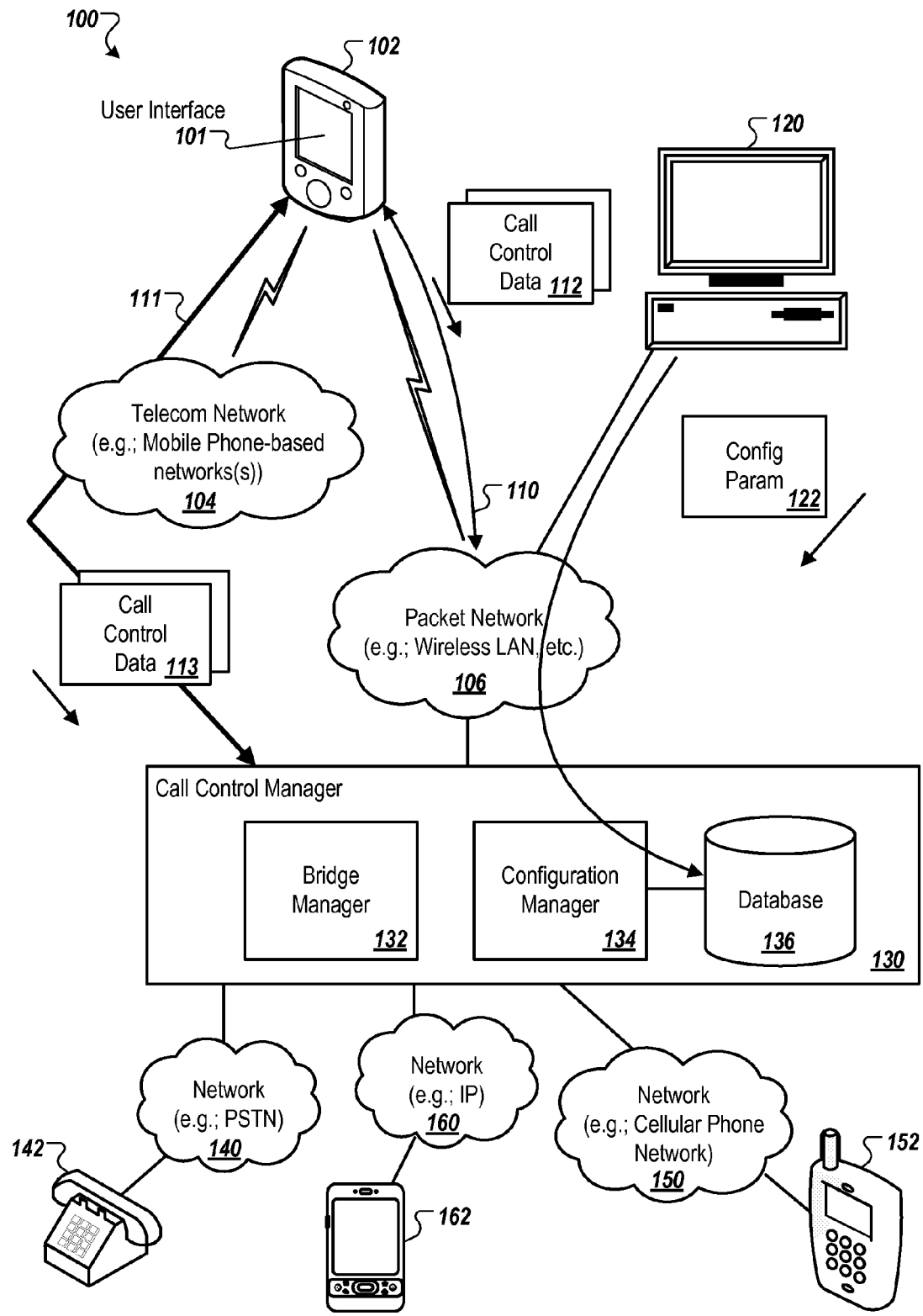
FIG. 1 is a block diagram of an example call management system, including a mobile device configured to interact with a call control manager.

FIG. 1 is a block diagram of an example call management system 100, including a mobile device configured to interact with a call control manager 130. In this example, a mobile device 102 can be configured to communicate using multiple modes of communication (i.e., "multi-modal channels of communication"). Network 104 operates in accordance with a first mode of communication. Examples of the first mode of communication include Public Switched Telephone Network ("PSTN") phone technologies, and cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and the like. Network 106 operates in accordance with a second mode of communication. Examples of the second mode of communication include VOIP phone technologies, wireless LAN technologies (e.g., telephone technologies/standards, such as WiMAX and any other IEEE 802.xx-based technologies/standards), and the like. Any number of modes is possible.

Further to FIG. 1, mobile device 102 can be configured to interact with a call control manager 130, over a call control communications channel, which in some implementations can be a broadband call control channel 110. In some implementations, broadband call control channel 110 can be established in network 106 (e.g., in the same or separate channel used to convey voice/video data, such as in a Session Initiation Protocol ("SIP") message). Note that in some implementations, another narrowband call control channel 111 can be established in network 104 (e.g., a mobile operator can be provided in the same or separate channel used to convey voice/video data, such as in an Short Message Service ("SMS") message). Mobile device 102 and/or call control manager 130 can be configured to establish narrowband 111 and/or broadband 110 call control channels so mobile device 102 and/or call control manager 130 can transmit and/or receive call control data 113 (over the narrowband call control channel 111) and/or 112 (over the broadband channel 110). Call control manager 130 can be configured to execute a number of call controlling functions that can be performed remotely from mobile device 102. As shown, call control manager 130 can perform call control operations in association with a first call from a phone 142 via network 140 and/or a second call from a phone 152 via network 150 and/or a third call from a phone 162 via network 160. In some implementations, call control manager 130 can be disposed in a central office ("CO"). In some implementations, mobile device 102 includes an interface, such as a user interface 101, for facilitating generation, receipt, processing, and management of call control data 112 and 113 for delivery over narrowband 111 and/or broadband 110 call control channels. Interface 101 can be configured to implement the functionalities described therein, including receiving inbound calls, dialing outbound calls, and click to call generating a combined inbound and outbound call.

In some implementations, call control manager 130 includes a bridge manager 132, a configuration manager 134, and a database ("DB") 136. Bridge manager 132 can be configured to perform inbound call delivery, call routing, call transfer functions, conference call functions, and the like, for mobile device 102. Call control manager 130 provides for bridging calls generated by disparate telecommunications technologies associated with communications devices 142, 152 and 162. For example, as an alternative to answering an inbound call on mobile device 102, the call can be recorded (such as using voice mail) on mobile device 102 and/or on the call control manager 130 and simultaneously reviewed on mobile device 102 via user interface 101. During call recording, the inbound call can be answered dynamically at mobile device 102 and/or transferred to one or more of communications devices 142, 152, and 162. Completed recordings (e.g., announcements, voice mail, etc.) can be reviewed at mobile device 102 via user interface 101.

Configuration manager 134 can be configured to interact with a remote computing device 120 or with a mobile device 102 to receive configuration parameter data ("conf param") 122. Further, configuration manager 134 can be configured to store configuration parameter data 122, and responsive to such data, call control manager 130 can be implemented by a user to control inbound calls before, during, or after reaching mobile device 102. Further, configuration manager 134 can be configured to store in database 136 audio files recorded via user interface 101 on device 102 and transmitted to call control manager 130 via narrowband 111 and/or broadband 110 call control channels.

Example Call Control Manager

Figure 2:
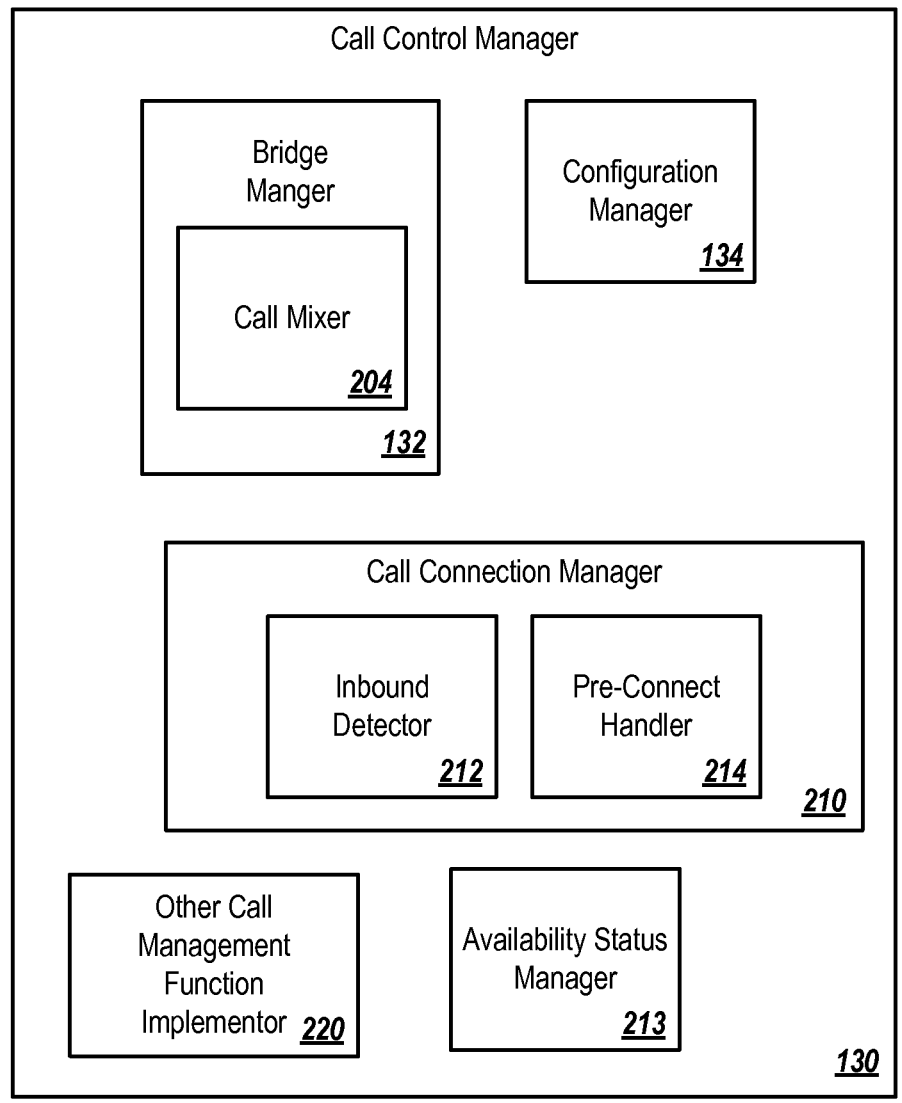
FIG. 2 is a block diagram of an example call control manager.

FIG. 2 is a diagram of an example call control manager 130. Call control manager 130 can include a bridge manager 132, a configuration manager 134, a call connection manager 210, an available status manager 213, and a call management function 220 configured to implement any other call control function described herein. Bridge manager 132 can include a call mixer 204. In some implementations, call mixer 204 can be configured to combine calls using various telecommunication technologies and protocols. Call mixer 204 can use different CODECs to implement the various telecommunication technologies and protocols. In some implementations, mixer 204 can reside in the mobile device, which can be the mobile device 102. Call connection manager 210 can include an inbound detector 212 and a pre-connect handler 214. Inbound detector 212 can detect a call from any communication device (e.g., communication devices 142, 152 or 162 of FIG. 1), and can determine whether a communication link via network 106 of FIG. 1 to mobile device 102 can be established. For example, inbound detector 212 can communicate with mobile device 102 to determine whether a data rate of more than, for example, 8 kb/sec is obtainable. If not, inbound detector 212 can provide a course of action (e.g., sending the call to voicemail) until the data rate is above an acceptable threshold.

Pre-connect handler 214 can interact with mobile device 102 to receive an instruction from call control data 112 to handle a call from either communications device 142 or communications device 152 of FIG. 1 before a connection is made. Pre-connect handler 214 can also interact with mobile device 102 to receive an instruction from call control data 113 to handle a call from any of communication devices 142, 152, and 162 of FIG. 1. For example, call control data 113 can be incorporated into an SMS message (or any other type of messaging protocol) capable of transport via network 104. Mobile device 102 can generate call control data 113 that includes an instruction that causes call control manager 130 to generate a message to any of communication devices 142, 152 and 162 of FIG. 1. An example of such a message is "I am out of wireless LAN range. I will call you later when I can make a VOIP call." Any of the components of call control manager 130 can be implemented in hardware or software, or a combination thereof.

Example Mobile Device Implementation

Figure 3:
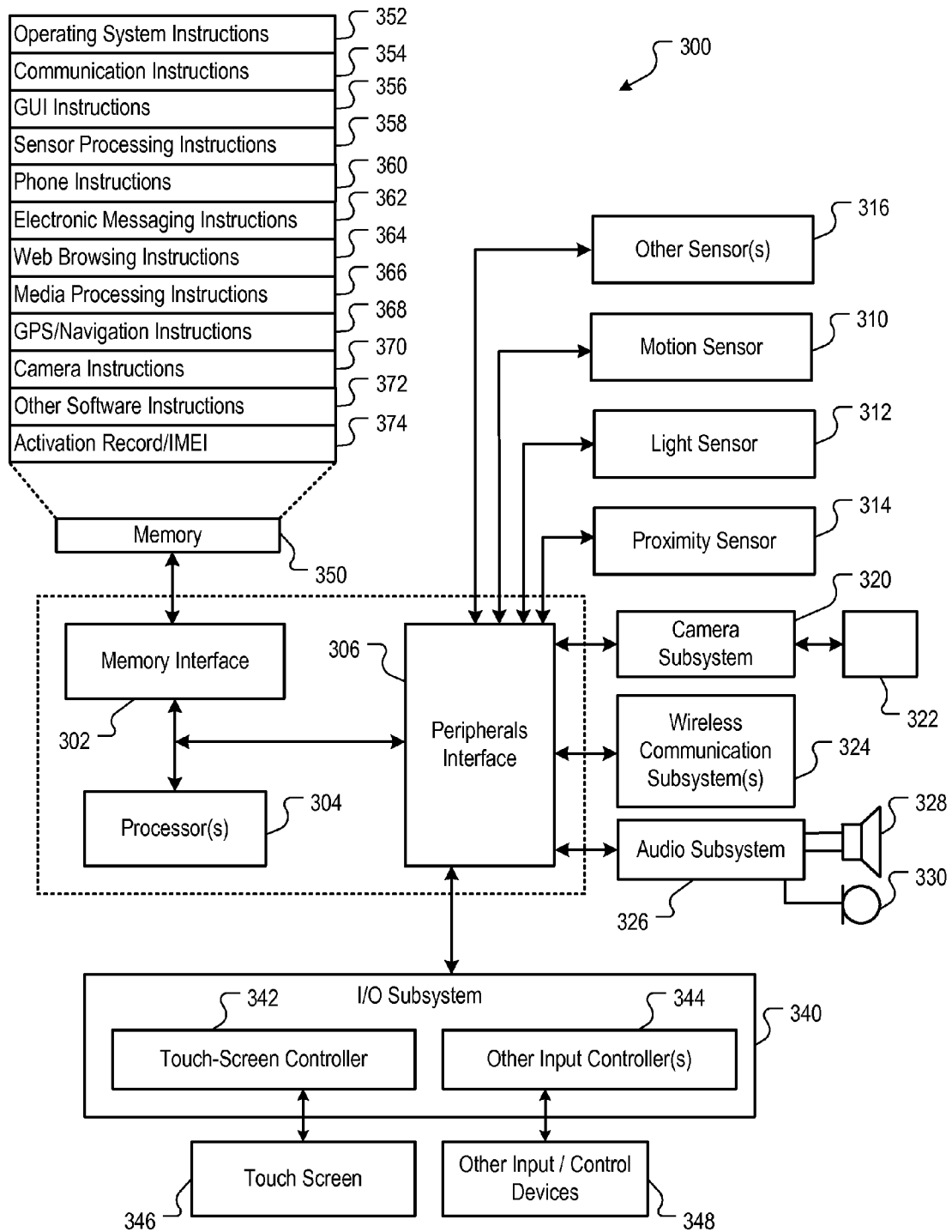
FIG. 3 shows example system architecture of a mobile device.

FIG. 3 is a block diagram of an example architecture 300 of a mobile device (e.g., mobile device 102). The mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystem 324 can include hosting protocols such that the mobile device 102 can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, the pressing of a button for a first duration can disengage a lock of the touch screen 346; and the pressing of the same or different button for a second duration that is longer than the first duration can turn power to the mobile device 102 on or off. The user can customize a functionality of one or more of the buttons. The touch screen 346 can, for example, also be used to implement virtual or soft buttons and/or a keyboard.

In some implementations, the mobile device 102 can present recorded audio and/or video files, such as MP3, AAC, and MPEG files. In some implementations, the mobile device 102 can include the functionality of an MP3 player.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device can be implemented in hardware and/or in software, including in one or more signal processing and/or application specific integrated circuits.

Example Call Management Process

Figure 4:
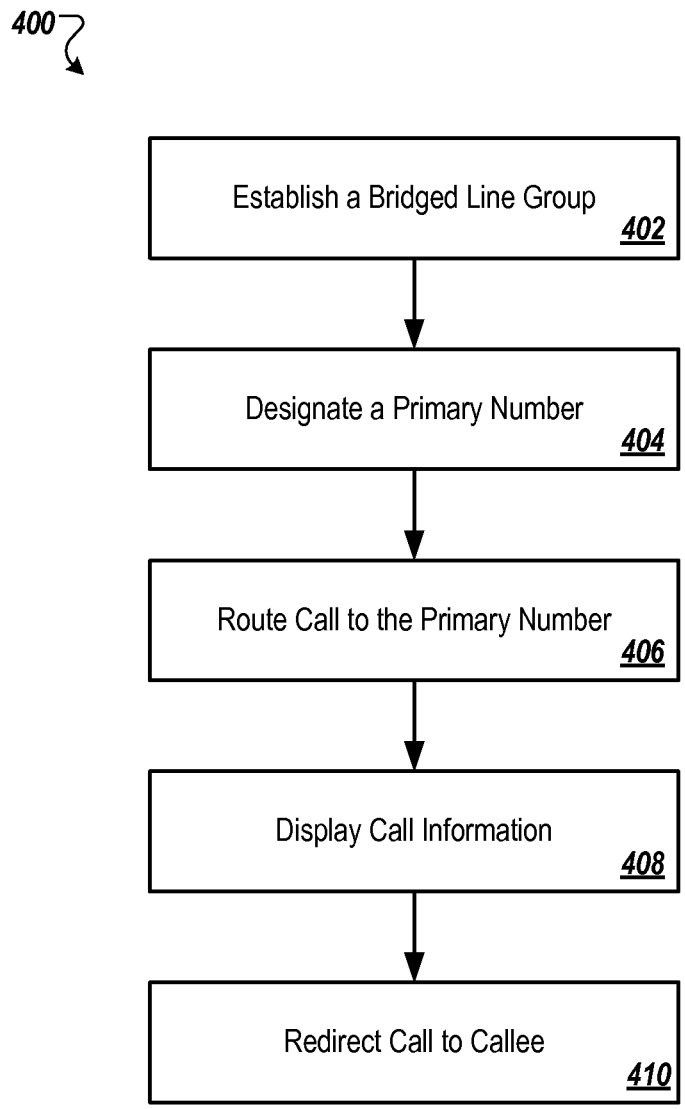
FIG. 4 is a flowchart illustrating an example process for implementing BLA on location-aware mobile devices.

FIG. 4 is a flowchart illustrating an example process for implementing BLA on location-aware mobile devices. In step 402, a bridged line group is specified in a vPBX system. The bridged-line group can include at least one monitoring user and at least a secondary user. Both the monitoring user and secondary user can have one or more extensions that are associated with mobile devices. A bridged line group can include a group of users or devices where one or more users or devices in the group can intercept phone calls to other users and devices in the group, and answer the phone calls. The users that can intercept and answer the phone calls to others can be classified as monitoring users. The users whose calls can be intercepted by the monitoring users can be classified as secondary users.

A bridged line group can have multiple extensions in the group. Each extension can be associated with a mobile device. Each mobile device can be associated with one or more direct numbers or extension numbers. For example, extension numbers 1234 and 1235 and direct numbers 800-555-1234 and 800-555-1235 can both be directed to a same mobile device. A mobile device can be identified in the vPBX system by an identification number. The identification number can include a unique label specified in the vPBX system, e.g., "m80001." The identification number can also be a serial number of the mobile device, e.g., 88018FA03533. The identification number can also be a Media Access Control ("MAC") address which encodes the manufacturer's registered identification number, e.g. 01:23:45:67:89:ab. The vPBX server can manage a mapping between an extension number with a mobile device's identification number, and a mapping between a mobile device's identification number with the mobile device. In a BLA group, each extension can maintain its own extension number. In addition, a group number can be designated for the BLA group. A group number can be a number associated with one of the users designated as a monitoring user for the BLA group, e.g., 1200. The vPBX server can maintain a set of rules that determines to which device in the BLA group the call is routed.

One or more administrators can manage BLA groups. A user can be identified as an administrator by entering a username and a password in a log-in process. In addition, a user can be authenticated as an administrator based on time and location. An authentication process can include receiving a user name and password as inputs. The authentication process can further include receiving information on a mobile device being used by the user. The authentication process can authenticate the user and determine that the user has administrative rights based on the combination of the name, password, and the mobile device's location information. As an additional security measure, the authentication process can also receive a time either from the mobile device or from a clock internal to the vPBX system, and authenticate the user based on the time. For example, a user can become an administrator of the vPBX system by logging in using a mobile device with a specific serial number, at a specific location, at a specific time.

Location based administrative privilege permits the vPBX system to give administrative permissions to users in the office, during normal office business hours. In addition, location based administrative privilege can increase the security when an administrator authenticates herself on a mobile device. A mobile device can be lost or stolen more frequently than a landline phone or a desktop computer. When a user name and password is stored on a mobile device, the person who finds or steals the mobile device can gain access to the vPBX system with the user name and password. With geographic location and time as extra authentication parameters, no authentication is possible with user name and password only. Therefore, it can be less likely that a lost or stolen mobile device to cause a system security breach.

Location-based administrative privilege can be implemented for location-aware mobile devices, such as mobile devices that are integrated with or connected to a positioning system. An example positioning system can be the Global Positioning System ("GPS"). A mobile device can have a built-in GPS receiver which can provide a geographical location of the mobile device. The vPBX system can detect the location of a location-aware mobile device by implementing an availability status manager, and using the availability status manager to detect the location of the mobile device by, for example, polling, receiving periodic location updates, or receiving updates triggered by movement of the mobile device.

In stage 404, a primary line of a BLA group is designated. The primary line of the BLA group can be a virtual line that has priority in answering calls to secondary lines in the group. The primary line can include/have associated therewith a set of rules stored on the vPBX server and the primary line extension which belongs to the BLA group. A primary line extension can be a monitoring user agent. A monitoring user agent is a device that can monitor incoming calls to extensions in the BLA group and answer, hold, forward or otherwise process the incoming calls. A primary line can be associated with an extension that is already in the BLA group. Alternatively, a primary line can be associated with a new extension that is not an existing extension in the BLA group.

For example, two users, Alice and Bob, can use mobile devices in the vPBX network. Alice is a manager. Bob is Alice's assistant. Alice and Bob can each have one or more extensions in a BLA group in the vPBX network. The extensions can be associated with one or more land line phones and mobile devices. An administrator can designate a line to Bob as a primary line on the vPBX server, and designate Bob's mobile device as a user agent monitoring incoming calls to the extensions in the BLA group.

The designation of primary lines and monitoring user agents can contain location or time based rules. For example, in a system where geographic locations of mobile devices in a BLA group in the vPBX server can be accurately or proximately determined, a mobile device can be designated a monitoring user agent based on its geographic location. For example, Bob can have a primary line in a BLA group that includes the mobile devices of Alice and Bob. Bob's line can be configured to be a primary line only when Bob's mobile device is in the office. Bob's mobile device can further be configured to be a monitoring user agent only when the mobile device is in the office during business hours, e.g., 9 am-noon, 1 pm-6 pm, Monday through Friday. During non-business hours, or when the vPBX server detects that Bob's mobile device is out of the office, the vPBX server can, for example, designate another device to be a monitoring user agent, designate a preconfigured backup line to be a temporary primary line, or temporarily cease the BLA functions, in which case both Alice's and Bob's mobile devices become regular extensions.

In stage 406, a call destined for a mobile device on a secondary line is routed to the monitoring user agent on the primary line according to primary line designation rules and location and time based rules. For example, in a BLA group where Alice has a secondary line and Bob has a primary line, and Bob's mobile device connecting to the primary line is designated as a monitoring user agent, an incoming call destined for Alice is routed to Bob's mobile device. Thus, when the vPBX server receives an incoming call to Alice's extension number, the vPBX server can route the call to Bob's mobile device. Bob can take the call, put the caller on hold, call Alice when the caller is on hold, and re-route the call to Alice. Bob can perform these actions by interacting with the vPBX server using a user interface for a mobile device.

A line that is not designated as a primary line can be a secondary line. Here, Alice can have a mobile device that is linked to the secondary line. Alice can receive a prompt on the mobile device when a call to that mobile device is routed to Bob. The prompt can be a flashing button on a display device associated with the mobile device. Alice can decide to take the call by, for example, tapping the flashing button on the display device. Other means for accepting the call are possible.

Further location-based routing can be made based on a current location of a monitoring user agent. A location-aware mobile device designated as a monitoring user agent can have its own location-based forwarding rules. For example, a vPBX server can implement a rule for a mobile device that states "if the current position of this mobile device is office, then route calls to this mobile device to a landline number." Thus, for example, when a caller calls Alice, the vPBX server can route the call to Bob's mobile device. Because of the location-based forwarding rules for Bob's mobile device, the vPBX server performs a second forward, routing the call to Bob's office phone, and displaying a bridged line appearance on Bob's office phone. If Bob's office phone is not BLA enabled, the vPBX server can apply predefined rules to handle the forwarding, for example, by ignoring the forwarding rule, or by routing the call directly to Alice.

In stage 408, call information is displayed on the mobile device designated as a monitoring user agent. The call information can include an originating phone number (if available) or an original extension number (if the call originated within the vPBX system). The call information also can include the name and extension of a callee. The call information can further include a status of the callee. The status can include whether the callee is on another line or whether the callee has a "do not disturb" status. The status can further include a location-based availability status. The vPBX system can provide a callee's location-based availability status to the monitoring user agent by, for example, determining geographic coordinates for the callee's location-aware mobile device.

In addition to displaying the call information on a display device of a monitoring user agent, the vPBX system can also display some or all call information on the callee's mobile or landline device. The display can allow the callee to accept calls directly. The display can be accompanied by a ring tone. For example, both an administrator and a callee can be given privilege to designate calls from certain callers as "personal" or "confidential." Calls designated as personal or confidential can be routed directly to the secondary users without interception of a monitoring user.

In stage 410, a call can be rerouted from the monitoring user agent to the callee. The vPBX server can redirect a call presently on a primary line to the callee. The redirection can be triggered by, for example, the primary line user's issuing instructions to the vPBX server to transfer the call to the callee. The redirection can also be triggered by, for example, the secondary line user's issuing instructions to the vPBX server to accept the call. The call redirected to the secondary line can be further routed to yet a third device, if the device on the secondary line is a mobile device that has a location-based rule that instructs the vPBX system to route calls to the third device, and if this location-based rule is properly applied.

Example Availability Status Manager

Figure 5:
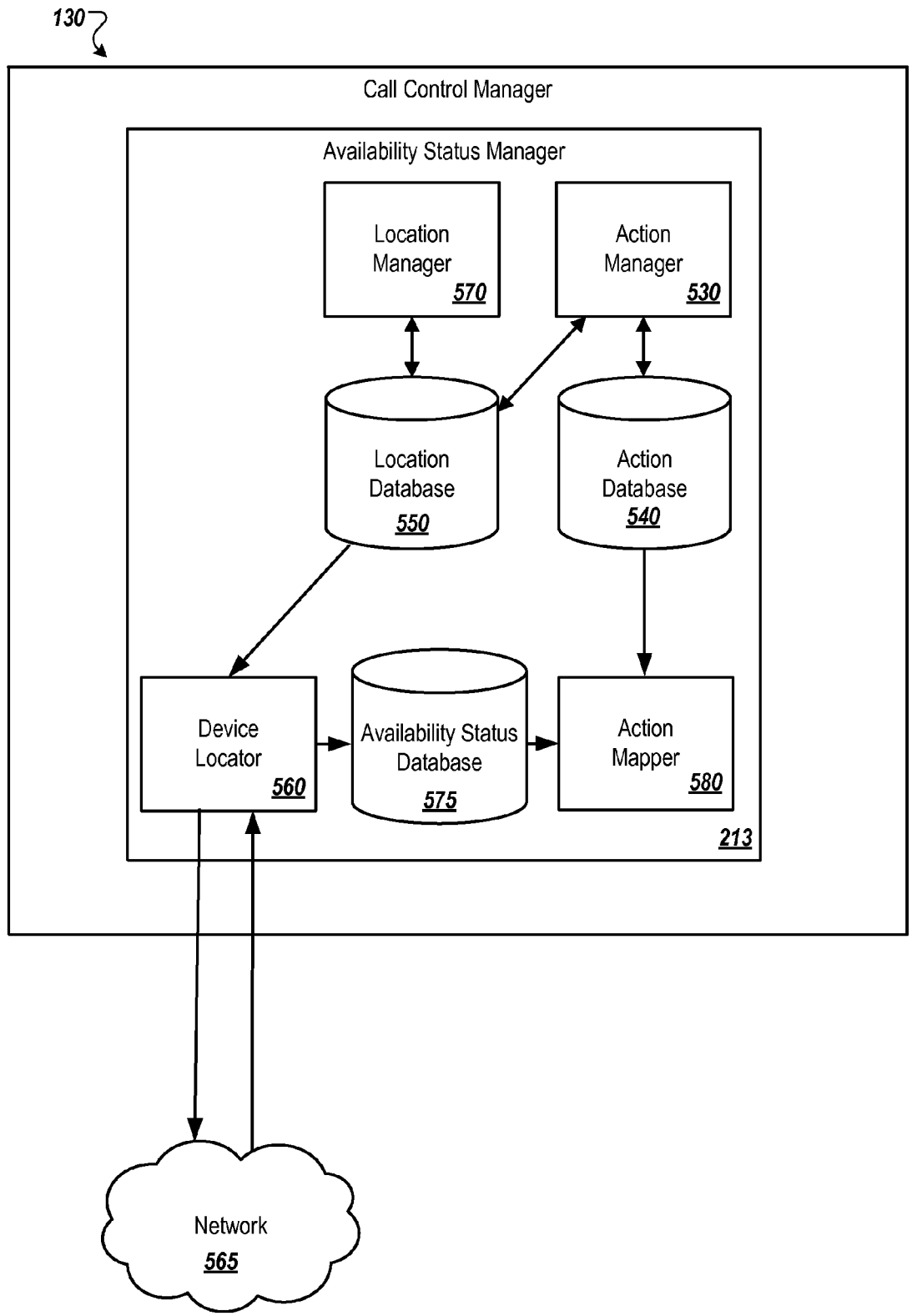
FIG. 5 is a block diagram of an example architecture of an availability status manager.

FIG. 5 is a block diagram of an example architecture of an availability status manager that can detect the geographic location of a mobile device and apply appropriate rules. The call control manager 130 in the vPBX system can contain an availability status manager 213. The availability status manager 213 can interact with other components of the call control manager 130, e.g. the bridge manager 132, the configuration manager 134, and the call connection manager 210 to manage voice and data communications in the vPBX network.

Availability status manager 213 can contain action manager 530 and action database 540. Action database 540 is a repository of action rules. An action rule determines what action the call control manager 130 performs when a mobile device at a specified location receives a call. For example, an action rule can state "if a mobile device is in office, reroute the call to a land line phone number in that office." Action manager 530 is responsible for adding, editing, and deleting the action rules in the action database 540. Action manager 530 can interact with other components of call control manager 130 to provide a user interface to facilitate the adding, editing, and deleting of the rules in the action database 540.

In some implementations, availability status manager 213 also contains a location database 550 and location manager 570. The location database 550 is a repository of location rules associating location labels with geographic locations. For example, the location database 550 can contain a mapping rule that if a mobile device is located within five meters from latitude x, longitude y, and altitude z, then the location status of the device is "office." The term "five meters" is a proximity radius. A proximity radius is helpful because a proximity radius can facilitate successful mapping when the device is in the proximity of a predetermined location rather than requiring an exact location match. As another example, the location database 550 can contain another mapping rule that if a mobile device is located within a space defined by vertices A, B, C, D, E, F, G, and H, the location status of the device is "home." The geographic coordinates of vertices A through H can also be stored in the location database 550. The location manager 570 can contain software tools for modifying the location rules stored in the location database 550. In yet another example, location database 550 can contain names of pre-defined features such as "California." Availability status manager 213 can determine whether a mobile device is located at or within the pre-defined feature by comparing a current geographic location of the mobile device with boundaries of the pre-defined feature. Such boundaries can be contained in a digital geographical referencing system such as the Topologically Integrated Geographic Encoding and Referencing ("TIGER") system of the United Status Census Bureau. Availability status manager 213 can make the determination based on an imported TIGER file, or by consulting an external system.

Availability status manager 213 also can contain an availability database 575. Availability database 575 stores the most current availability status of mobile devices within the vPBX network. Availability status of a mobile devices describes the status of the device, e.g. "home," "out of town," or "office."

Availability status manager 213 also can contain a device locator 560. Device locator 560 is responsible for receiving the geo-location information from the mobile devices within the vPBX network. Device locator 560 works with other components in the call control manager 130 to get device geo-location information from a communication network 565. In some implementations, the device locator 560 can actively poll the mobile devices within the vPBX network or passively receive the geographic information from the mobile devices. After receiving current geographic coordinates from a mobile device, the device locator 560 matches the geographic coordinates with the location rules in the location database 550. The match can be an exact match, a proximate match when the current geographic coordinates are within the proximate radius of a location, or a space match if the current geographic coordinates are within a space defined by a set of vertices. If the device locator 560 finds such a match, the device locator 560 updates the availability status database 575.

The geographic location of a mobile device can be determined by a GPS receiver that is integrated with, or coupled to the mobile device. The geographic location of a mobile device can be determined by a triangulation program that measures the distances between the mobile device and a plurality of cellular phone transmission towers. The geographic location can be transmitted from the mobile device to device locator 560 periodically, upon a triggering event, or upon polling by the device locator 560.

When the call control manager 130 detects a call to a mobile device connected to the vPBX network, the call control manager 130 checks the device status by querying the availability status database 575. The call can be originated from outside the vPBX network or originated within the vPBX network. The call can be to a mobile device. An action mapper 580 queries both the availability status database 575 and action database 540 to determine what action to take on the call to the mobile device. For example, if the status of a device is "office" in the availability status database 575, and an action rule states "if a mobile device is in office, route calls to that mobile device to a landline phone number in that office," then the action mapper 580 instructs call control manager 130 to reroute the call to the landline phone number in that office. Location based routing can include routing a call to the primary telephone number based on the geographic location of the mobile device of a monitoring user. Similarly, location based routing can include routing a call to the primary telephone number based on the geographic location of the mobile device of a secondary user.

Example BLA Call Transfer

Figure 6:
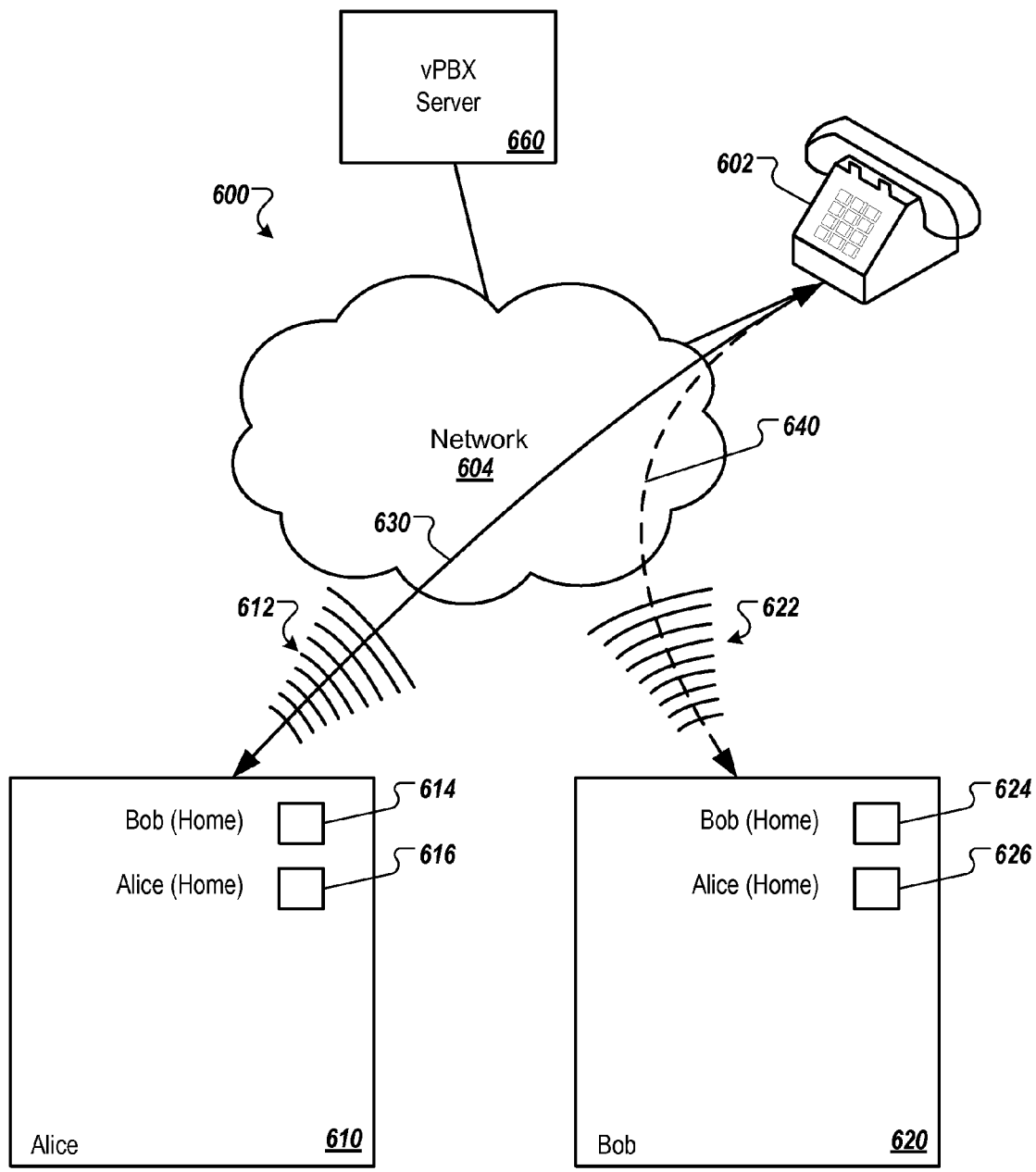
FIG. 6 illustrates an example routing of an incoming call to an extension in a BLA-enabled vPBX system that includes mobile devices.

FIG. 6 is an example routing of an incoming call to an extension in a BLA-enabled vPBX system whose extensions include mobile devices. The vPBX system includes a vPBX server 660 and two mobile devices 610 and 620. In some implementations, the vPBX system can include more than two mobile devices, as well as non-mobile devices such as landline phones, voicemail servers, or virtual voicemail servers incorporated into the vPBX server 660. Mobile devices 610 and 620 can be connected to each other and to the vPBX server 660 through a communications network 604. Communication network 604 can be a switched (phone) network, a packet network (Internet), or another form of network, or a combination of networks. In this example, mobile devices 610 and 620 can be connected to the communication network 604 through wireless connections 612 and 622, respectively. Mobile devices 610 and 620 are configured to be in a BLA group in the vPBX system. In this example, each of the mobile devices 610 and 620 can have one designated extension number, and can handle one "line" of communication. However, each mobile device can display its own status and the status of the other mobile device in the BLA group. In this example, Bob's mobile device 620 can be configured to be a monitoring user agent associated with a primary line in the BLA group, and Alice's mobile device 610 can be configured to be a regular mobile device associated with a secondary line in the BLA group.

A caller calls Alice from a device 602. Device 602 can be, for example, a landline phone, a soft phone, or a mobile device. Device 602 can be within the vPBX system, in which case the caller can call Alice by dialing on device 602 an extension associated with mobile device 610. Alternatively, device 602 can be outside the vPBX system, in which case the caller can call Alice by dialing a telephone number and an extension.

On vPBX server 660, a configuration parameter in the BLA group designates Bob's mobile device 620 as the monitoring user agent associated with a primary line. Because of this designation, the vPBX server 660 routes the call originated from device 602 to Bob's mobile device 620 through connection 640. Upon receiving the call, Bob's mobile device 620 can display call information on a display device. Mobile device 620 can display status for all the mobile devices in the BLA group. The status can include the name of the mobile devices (e.g., Alice and Bob), location-based availability status for each device (e.g., "home" or "office"), and appearance buttons 624 and 626 for each mobile device. A name of the mobile device can be, by default, the name of a person at the extension to which the mobile device is assigned. A location-based availability status can be determined by an availability status manager, which maps a current geographic location of a mobile device with a pre-determined location with a given label (e.g. "home"). A line status can show whether a mobile device is busy. For example, if Alice is already talking with another caller, the line status 626 for Alice can be set to blink, be highlighted, or show "busy" in another visual manner. Meanwhile, a line status 624 can indicate whether Bob's mobile device 620 is being called directly.

On Alice's mobile device 610, appearance button 614 for Bob can indicate that Bob's status is busy. Furthermore, the appearance button 614 can indicate that Bob is answering a call on behalf of Alice. Appearance button 616 can be set to indicate that a phone call destined for Alice is being handled by Bob.

The call from device 602 can be rerouted to Alice through connection 630 by instructions from either Bob or Alice. For example, mobile devices 610 and 620 can both have display screens that can accept touch-screen input. Bob can transfer the call to Alice by tapping the appearance button 626 on mobile device 620. Alternatively, Alice can accept the call by tapping appearance button 616 on mobile device 610.

The line status displays 614, 616, 624, and 626 on mobile devices can be made consistent with existing phones in the vPBX system. For example, line status displays 614, 616, 624, and 626 can be made to simulate pre-defined Light Emitting Diode ("LED") indicators display schemes. Table 1 illustrates one example display scheme for LED indicators.

TABLE 1

BLA Status Display

| Call Appearance State | LED Indicator Behavior |
|---|---|
| Disabled | Unlit |
| Idle | Steady Green |
| Ringing (incoming) | Fast Blink Green |
| Local Held | Slow Blink Red |
| Local Dialing/Calling/Proceeding | Steady Red |
| Local Connected | Steady Red |
| Local Invalid (remote hang up or error) | Steady Red |
| Local Busy | Steady Red |
| Remote Held | Slow Blink Amber |
| Remote Dialing/Calling/Proceeding | Steady Amber |
| Remote Connected | Steady Amber |
| Remote Invalid (remote hang-up or error) | Steady Amber |
| Remote Busy | Steady Amber |

Example User Interface for BLA in a Hybrid vPBX System

Figure 7:
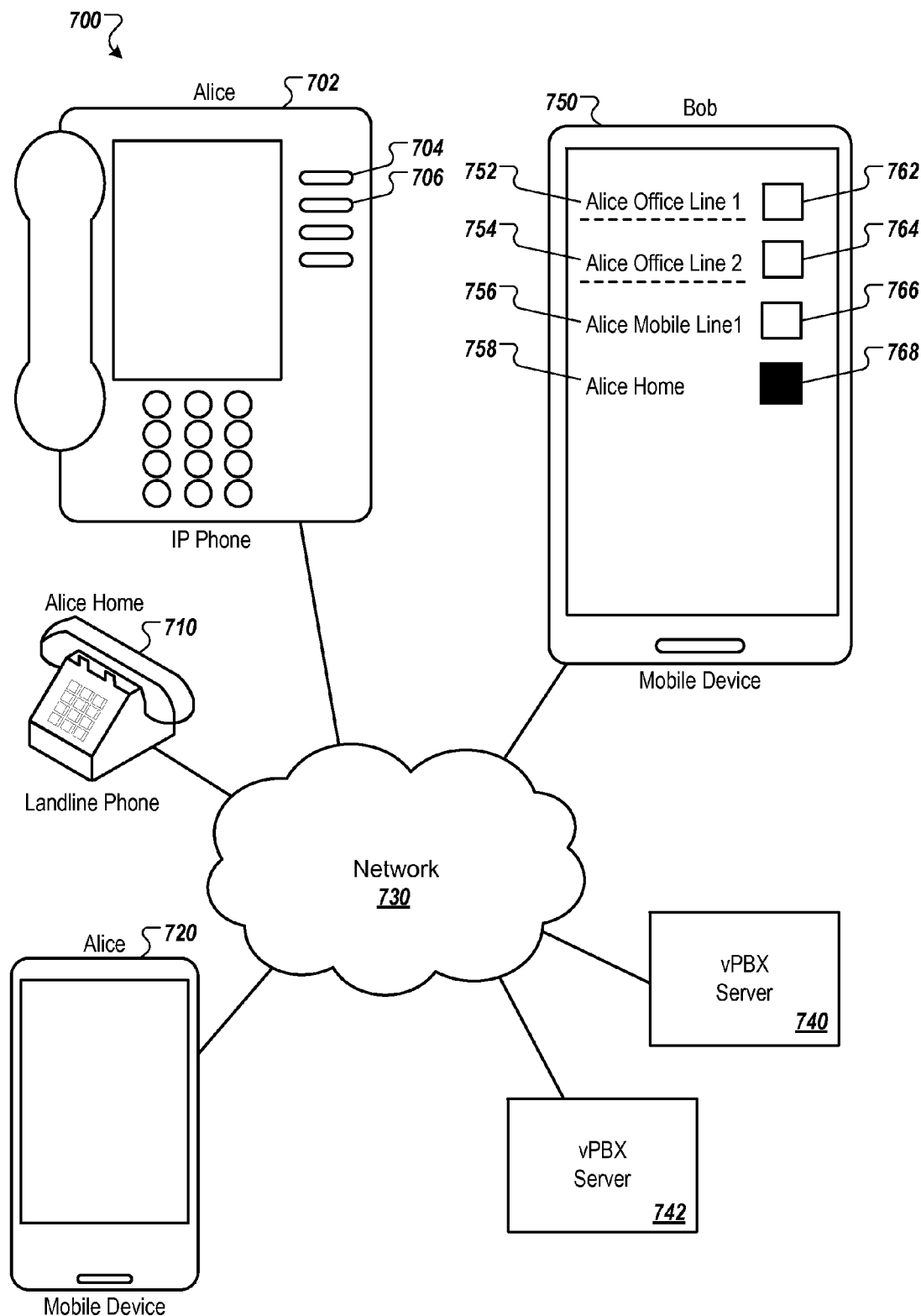
FIG. 7 illustrates an example routing of an incoming call to an extension in a BLA-enabled vPBX system that involves location-based forwarding.

FIG. 7 illustrates an example routing of an incoming call to an extension in a BLA-enabled vPBX system that involves location-based forwarding. In FIG. 7, a vPBX system includes distributed vPBX servers 740 and 742. Mobile devices 750 and 720, IP phone 702, and landline phone 710 are connected to the vPBX servers through a communications network 730. IP phone 702 can be Alice's office phone with two lines. Mobile devices 750 and 720, landline phone 710 and IP Phone 702 are configured to be in a BLA group in the vPBX system, Bob's mobile device 620 being a primary line, Alice's mobile device 610 and IP phone 702 being secondary lines.

In this example, a caller calls Alice. Bob's mobile device 750 answers the call. Bob's mobile 750 can show Alice's status at various phones. For example, on the display of Bob's mobile device 750, Bob can see a status 762 for line one on Alice's IP phone, status 764 for line two on Alice's IP phone, status 766 for Alice's mobile device 720, etc.

In this example, the vPBX server 740 can contain a location rule that specifies that if Alice's mobile device 720 is located at a pre-defined geographic location that coincides with Alice's work place, Alice's status is set to "office." The vPBX server 740 can also contain an action rule that specifies forwarding actions that the vPBX server 740 can take if a mobile device is at a certain location. For example, an action rule can specify that if Alice's status is "office," the vPBX server 740 can direct calls destined for Alice's mobile device 720 to Alice's IP phone 702 located in Alice's work place.

Based on the location rules and action rules, the vPBX server 740 can determine a location-based availability status of a user, and send the location-based availability status to a monitoring user agent for display. In this example, mobile device 750 displays Alice's availability status by highlighting "Alice's Office Line 1" 752 and "Alice Office Line 2" 754. The highlighting can be based on the location information alone, when Alice is inferred to be physically in office. Alternatively, the highlighting can be based on a combination of location information and action information. After inferring that Alice is physically in office, the vPBX server 740 can route calls directed to Alice's mobile device 720 to Alice's IP phone 702, based on action rules. The vPBX server 740 can highlight prompt lines 752 and 754 on display screen 750. Because a call to Alice's mobile device will be forwarded, the prompt 756 for Alice's mobile device is not highlighted.

When the vPBX server 740 infers that Alice is at her work place based on the geographic location of Alice's mobile device 720, the vPBX server 740 can also determine that landline phone 710 is not a proper destination to route the phone call, based on prior-defined location parameters for devices in the vPBX system. In some implementations, the vPBX server 740 can cause the primary line mobile device to display the information that landline phone 710 is not a proper destination by displaying a distinct appearance button 768 (e.g., black) for the landline phone, by not displaying the landline status at all, or by displaying a landline appearance button 768 but disable the routing to this destination.

The vPBX server 740 can be configured to dynamically check the location of Alice's mobile device 720, and change Alice's status on a monitoring user agent in a BLA group. For example, if Alice moves away from office during the time that Bob is answering a call on Alice's behalf, the display on Bob's mobile device 750 can stop highlighting Alice's office lines 752 and 754. The display can also disable Bob's options to forward the calls to Alice's office IP phone 702 by disabling appearance buttons 752 and 764.

Example User Interfaces for Editing Action Rules

FIGS. 8A-8F show an example user interface for adding and editing a virtual call group from a mobile device. In FIG. 8A, a mobile device user creates a new BLA call group on device screen 800. In this example, device screen 800 can accept touch-screen input. A BLA call group can enable efficient call management among a small group of people. For example, a BLA call group can enable an assistant to efficiently support and manage the call flow for one or more managers. The assistant reduces a call volume by filtering the calls for other people in the call group. It is important that each member of the work group can determine:

What lines are ringing, or on-hold, or connected?
What line am I currently using?
What calls do I have on hold and how do I pick up a call on hold?
What calls to my extension are other people currently handling?
When I am told to pick up a call, what do I do?

In some implementations, a user must have administrative privilege to access the screen 800. On screen 800, the user can tap a button 802 "Create Group" to add a group. A user can also tap a "cancel" or "log out" button (not shown) to leave screen 800.

In FIG. 8B, a user with administrative privileges can enter BLA group information on a mobile device screen 810. The user can enter a BLA group name by tapping a group name input area 812. The user can enter a primary line number in a primary line number input area 814. The primary line number can be, for example, a direct number for a device in a vPBX network, e.g., 800-555-1212, or an extension number, e.g., 1000. The user can also specify a primary line number by specifying a device associated with a primary line number, such as a MAC number or a serial number. The line number associated with the device will then be designated to be a primary line number. The device associated with the primary number can become a monitoring user agent. A monitoring user agent can be, for example, a landline phone, a mobile device, or a soft phone, etc. If the device associated with the primary line number is a location-aware mobile device, the primary line number can be subject to location-based forwarding rules defined for the mobile device. If more than one device is associated with a primary line number in a vPBX system, another user interface can be used to determine monitoring priority according to which of the devices are assigned incoming phone calls to the BLA group. A user can also enter a name for the primary number specified in a primary name input area 816. The name can be, for example, "Bob" or "Assistant." If the user does not enter a primary name, the vPBX system can give the line a default name, which can be a name already associated with the primary line number in the vPBX system.

In FIG. 8C, a user can add a secondary line from a mobile device screen 820. In FIG. 8C, a group name, primary line number, and primary name have already been specified. The user can add the secondary line by tapping a secondary line input area 822. The user can tap a "Done" button 824 to enter the secondary line into the BLA group in a vPBX system after the user completes imputing a second line.

In FIG. 8D, a user can add another secondary line from a mobile device screen 830 to a BLA group when the BLA group already contain one or more secondary lines. In this example, the BLA group already contains two secondary lines, both for Alice, one based on an extension number 1001 and another based on a direct line number 560-555-1212. The user can add one or more secondary lines by tapping a secondary line input area 832. After finishing adding secondary lines, the user can finish by tapping the Done button 834.

FIG. 8E shows a mobile device display screen 840. In this example, A BLA group 842 "Alice's Virtual Office" has already been created in a vPBX system. A user can tap group 842 "Alice's Virtual Office" to edit the primary and secondary lines in the group. The user can also tap button 844 "Create Group" to enter a create-group screen to create a new BLA group.

FIG. 8F shows a mobile device display screen 850. In this example, a user can edit a line in a BLA group on the display screen 850. A user can enter display screen 850 by a variety of ways. For example, a user can tap a display "Secondary Line 1" as in FIG. 8D, or can reach screen 850 by a hierarchical menu designed for group line management. A user can edit the name of the line being edited in a name editing area 852. A user can also change the number of the line in a number changing area 854. A primary line status area 856 displays whether the line being edited is a primary line. If the line being edited is a primary line, primary line status area 856 displays a check mark. A user can toggle the primary line status by tapping the primary line status area 856. A user can also delete the line from the BLA group to which the line belongs by tapping a Delete button 858. A user can leave line editing screen 850 by tapping a Done button 859. FIGS. 8A-8F show examples of user interfaces and are described in terms of example interactions. Other types of interfaces and other interactions schemes are possible. For example, while reference has been made to "tapping" the user interface associated with a touch device, other types of devices and other forms of user input are possible.

Example Call Handling by a Primary Contact

FIGS. 9A-9D show an example user interface for a primary contact of a group to dispatch a call. In the example in FIGS. 9A-9D, Alice is a manager, Bob is an assistant. Bob and Alice are in a BLA group configured in a vPBX system. Bob is a primary contact. Bob's mobile device is configured to be a monitoring user agent associated with a primary line in the BLA group. Alice has an office phone with two lines, a location-aware mobile device, and a landline home phone, all configured as secondary lines in the BLA group.

Figure 9A:
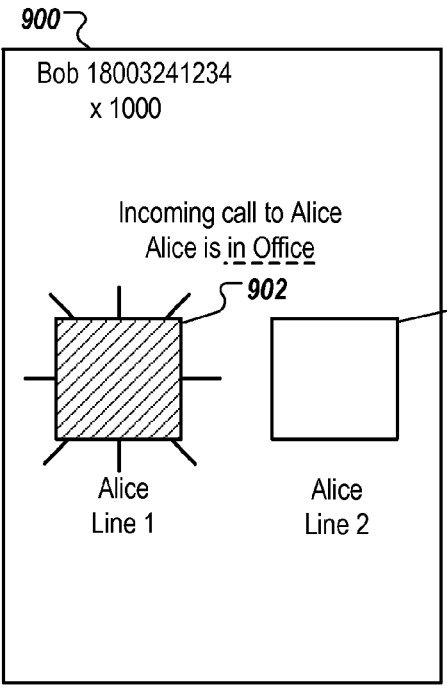
FIGS. 9A-9D show an example user interface for a primary contact of a group to dispatch a call.

FIG. 9A illustrates an example screen 900 on Bob's mobile device. A caller calls Alice by dialing Alice's phone number or extension number. Because Alice's line is a secondary line, the vPBX server routes the call to Bob's mobile device which was designated as a monitoring user agent. The vPBX system can contain a location database that stores rules mapping a location status with geographic coordinates. A mapping rule can be that if a mobile device is located within five meters from latitude x, longitude y, and altitude z, then the location status of the mobile device is "office." For example, the vPBX system can determine that Alice's mobile device is in the office. The vPBX system can infer that Alice is in the office and cause Bob's screen 900 to indicate that Alice is in the office.

Furthermore, the vPBX system can contain an action database that stores action rules. An action rule can be that if Alice is in the office, then all calls destined for Alice are routed to Alice's office phone. Based on the action rule, the vPBX system can display the status of Alice's office phone on Bob's screen 900. For example, appearance button 902 of Alice's office line 1 can be blinking on Bob's screen 900, indicating that if Alice would answer the call, the call would be routed to Alice's phone through line 1. Appearance button 904 for Alice's second office line can be highlighted, indicating Alice's second line is unavailable. Appearance button 904 can also be not blinking and not highlighted, indicating Alice's second office line is available. Bob can tap the appearance button 902 to perform a variety of actions.

For example, by tapping an appearance button 902 on screen 900, Bob can answer an incoming call to a shared appearance. Once connected, Bob can hold, re-direct, transfer, park, or hang up on the call. A monitoring user can park a call to a secondary user. To park a phone call is to temporarily put a call to a park area. A park area can have a park ID. The call to the secondary user's mobile device can be intercepted by the monitoring user. The monitoring user can decide whether to put the call in the park area based on a call status of the secondary user. The monitoring user can view the call status of the secondary user by viewing the appearance of the extension number of the secondary user on a display device. The display device can be a screen on a mobile device.

A monitoring user can redirect a call to a secondary user which was received by the monitoring user. Redirecting a call can be based on the call status of the secondary user. Redirection can include sending the call to a third user. The third user can use a device within the BLA group, but the third user does not have to use such a device. The third user is not required to use a device in the vPBX network.

A mobile device in a vPBX system can be configured to perform a remote hold retrieve function. Given appropriate permissions, a user can retrieve a call that has been placed on hold by a remote user by tapping a button associated with the line appearance. If the remote hold retrieve function is not enabled for a user, when the user taps an appearance button of another extension, the user can speed-dial that extension. The speed-dial can ring through if the extension has another line appearance available, otherwise the speed-dial can go directly to voicemail. In an example, after picking up the call to Alice by tapping appearance button 902, Bob can put the call to Alice on hold. Bob can inform Alice of the caller on a second line by tapping appearance button 904. Because there is no hold on appearance button 904, Bob's tapping causes a speed dial to Alice's line 2. Alice can decide to retrieve the first call that Bob put on hold through the remote hold retrieve function. Alice can also pick up line 2 to talk to Bob. The default value of the permission for a user to retrieve a call that has been placed on hold can be "yes."

A mobile device in a vPBX system can be configured to perform a call barge function. A barge-in feature enables a user (e.g., a monitoring user) to enter a conversation between another user (e.g., a secondary user) and a third user (e.g., a calling party using a mobile device not within a BLA group). A user can barge into a call to one of the user's own lines that has been picked up by a remote user, by tapping an appearance button for that extension. With appropriate permissions (default permission setting is "yes"), the user can also barge into a remote appearance call by pressing the appearance button. When a barge occurs, the call presence can be set to "local" to both mobile devices, and "remote" to any other user with the same call appearance. In this example, if appearance button 904 is blinking or highlighted, indicating Alice's second line is busy, Bob can still tap appearance button 904 to barge into Alice's second line to inform Alice of the call on Alice line 1, if Bob has permission to barge into Alice's calls.

A mobile device in a vPBX system can be configured to perform a line seize function. If a line seize function is enabled for a user, the user can make an outbound call from a shared line by simply tapping that line. As an example, if the line seize function is enabled for Bob on Alice, Bob can tap appearance button 904 for Alice's line 2 on screen 900 to select Alice's line 2, and dial out on Alice's line 2, if Alice's line 2 is available.

An appearance button 902 can be multi-use, such that it can speed-dial the extension or perform the line seize function. To determine whether to speed-dial or line-seize, a vPBX server can use a pop-up user prompt to offer the user a choice. Alternatively, a vPBX server can use location-based rules to make the determination. For example, if the vPBX system determines that Alice is not in office, Bob seizes Alice's line 2 by tapping appearance button 904. If the vPBX system determines that Alice is in office, Bob's tapping appearance button 904 speed-dials Alice's line 2. The vPBX system can inform Bob of the possibly different actions by displaying a highlighted prompt that "Alice is in Office" on display screen 900, or by captioning appearance button 904 with the action name "seize line" or "speed-dial."

If a line seize function is not enabled for a user, when the user taps an appearance button of another extension, the user can speed-dial that extension. The speed-dial can ring through if the extension has another line appearance available, otherwise the speed-dial can go directly to voicemail. For example, if the line seize function is not enabled for Bob, tapping appearance button 904 can result in a speed-dial from Bob's mobile device to Alice's line 2.

A BLA group on a vPBX system can be configured to manage queue interaction by adjusting the display status for a user when a call to that user is picked up by a primary contact. When Bob picks up a call to Alice by tapping appearance button 902 on mobile screen 900, Alice's appearance buttons for line 1 on other mobile devices will not be highlighted or blinking to show Alice's line 1 is busy. Alice's appearance buttons for line 1 on other mobile devices can be changed to busy after Bob connects the call with Alice on line 1.

If a remote call appearance has multiple lines associated with it, and a remote user is already using the first line, a primary contact can answer incoming calls on line 2, 3, etc., if the primary contact has lines 2, 3, etc. configured for bridged appearance on the primary contact's mobile device. For example, if Alice is already using Alice line 1, but Alice line 2 is available, appearance button 902 can show a busy status, and Bob can pick up a call to Alice not by tapping appearance button 902, but by tapping appearance button 904.

A mobile device associated with a primary line can have call forwarding features. A monitoring user agent can be configured to permit forwarding calls to the monitoring user agent (e.g., a call to Bob), permit forwarding calls to the bridged appearance (e.g., a call to Alice), or permit both.

Figure 9B:
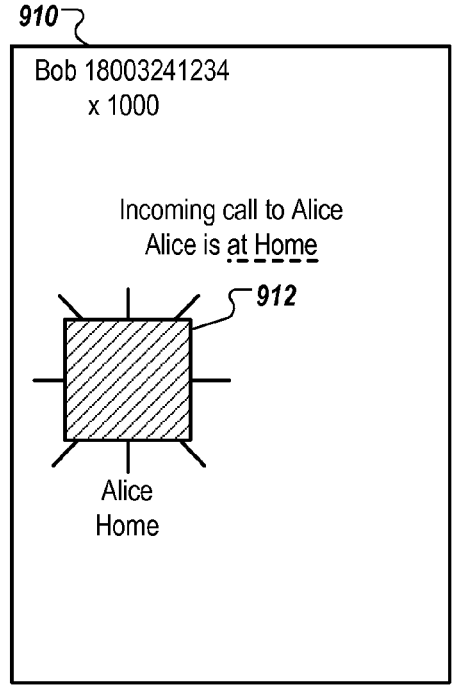

FIG. 9B illustrates an example screen 910 on Bob's mobile device. A caller calls Alice's location-aware mobile device. A vPBX server determines that Alice is at home, based on the geographic coordinates of Alice's location-aware mobile device. Based on location rules and action rules, the vPBX server can display Alice's availability status is "at home" on screen 910. The vPBX server can also display an appearance button 912 that can function to display Alice's home phone status (e.g., whether the home phone is busy, or set to "do not disturb" (DnD) status). Bob can perform actions by tapping the appearance button 912 to pick up the call, forward the call, etc.

DnD status of a mobile or landline device can affect whether the device has an audible ring and displays incoming caller information. As an alternative to displaying DnD status in an appearance button 912, the vPBX server can be configured not to display a DnD status in a BLA appearance button. For example, a primary line appearance 912 of a secondary device (Alice's home line) can show that the home line's status is available, even if the home line status is DnD. A setting on the vPBX server can route a call from either a primary contact (Bob) or an outside caller to Alice's voicemail. Alice's home phone whose answering rules are set to DnD can also show as available to a remote caller.

Figure 9C:
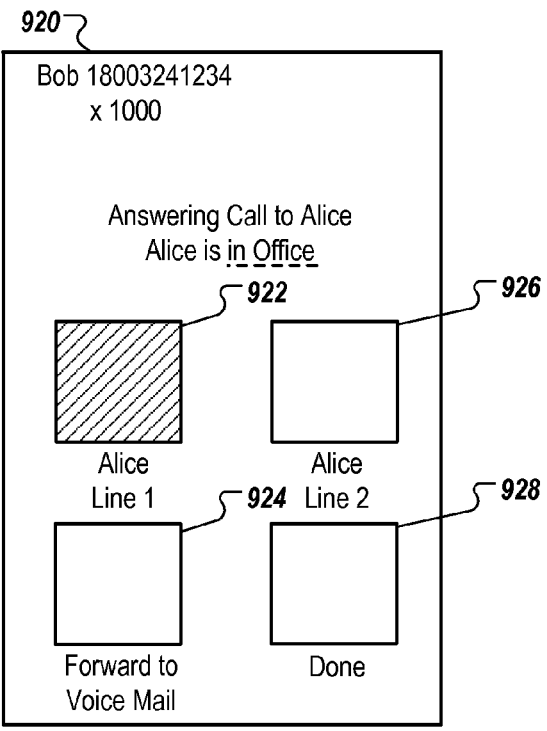

FIG. 9C shows an implementation where a primary contact can have detailed call routing options on a screen 920 on a mobile device, after Bob picks up a call to Alice by tapping appearance button 902 on screen 900 (see FIG. 9A). Bob can forward the call to Alice's line 1 by tapping appearance button 922, forward the call to Alice's line 2 by tapping appearance button 926, forward the call to Alice's voice mail by tapping appearance button 924, or hang up by tapping the button Done 928. The appearance buttons 922, 924, and 926 can display various status of the lines they represent. For example, if Alice's line 1 is busy, appearance button 922 can show, for example, a color (e.g., red) that represents the busy status.

The vPBX server can provide further options to the appearance buttons 922, 924, and 926 based on the functions enabled for the primary user. For example, if call barge is enabled for Bob, appearance button 922 can be enabled for Bob to barge in the conversation on Alice's line 1. For another example, if line seize is enabled for Bob, tapping appearance button 926 (which shows Alice line 2 is available) can bring up a display that gives Bob an option to seize Alice's line to dial outside, to speed-dial Alice line 2, or to forward the current call to Alice on line 2.

Figure 9D:
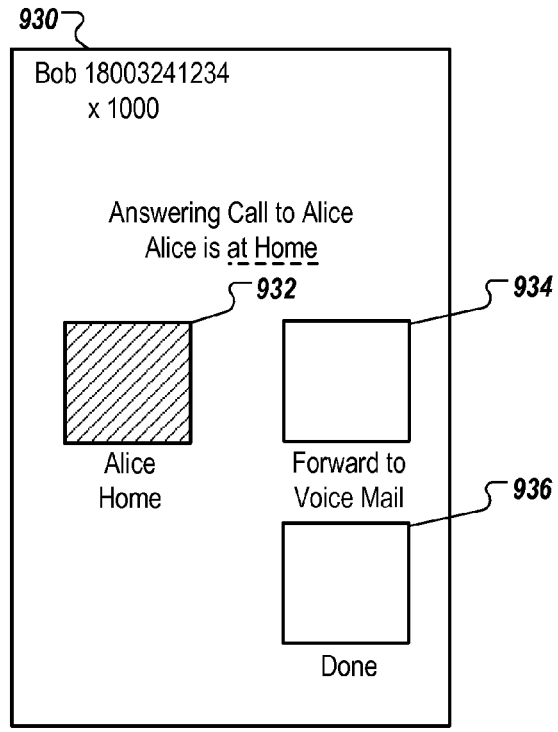

FIG. 9D shows an implementation where a primary contact can have detailed call routing options on a screen 930 on a mobile device, after Bob picks up a call to Alice by tapping appearance button 902 on screen 900 (see FIG. 9A). In this example, the vPBX server determines Alice is at home based on the geographic location of Alice's location-aware mobile device. Alice's home phone can be configured to be in a DnD status that can be overwritten by Bob. On screen 930, Bob can see that Alice is at home, and Alice's appearance button 932 shows a DnD status by displaying, for example, a specific color. Bob can decide to honor the DnD status of appearance button 932 by forwarding the call to voice mail by tapping appearance button 934. Alternatively, Bob can decide to ignore the DnD status and route the call to Alice's home phone by tapping appearance button 932. Bob can also hang up on the call by tapping "Done" button 936.

Figure 10A:
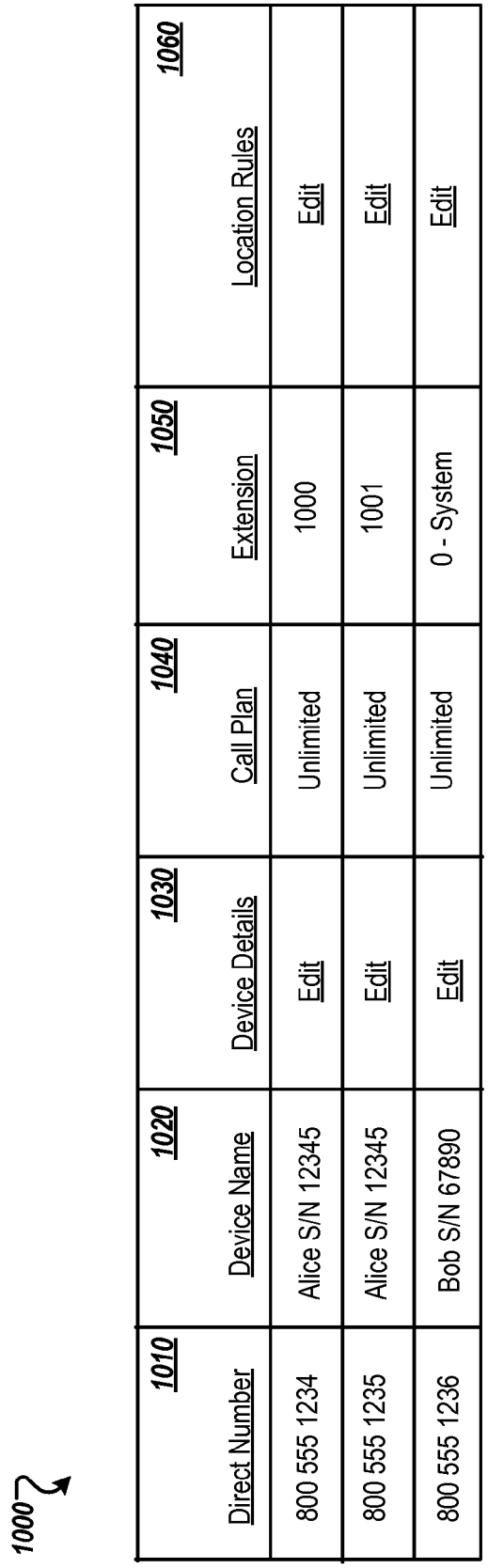
FIG. 10A-10C show example administrative screens of a BLA group.
Figure 10C:
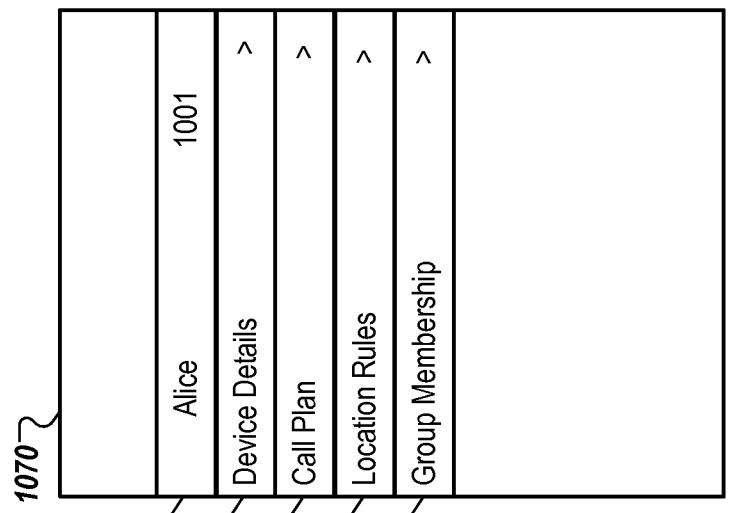
Figure 10B:
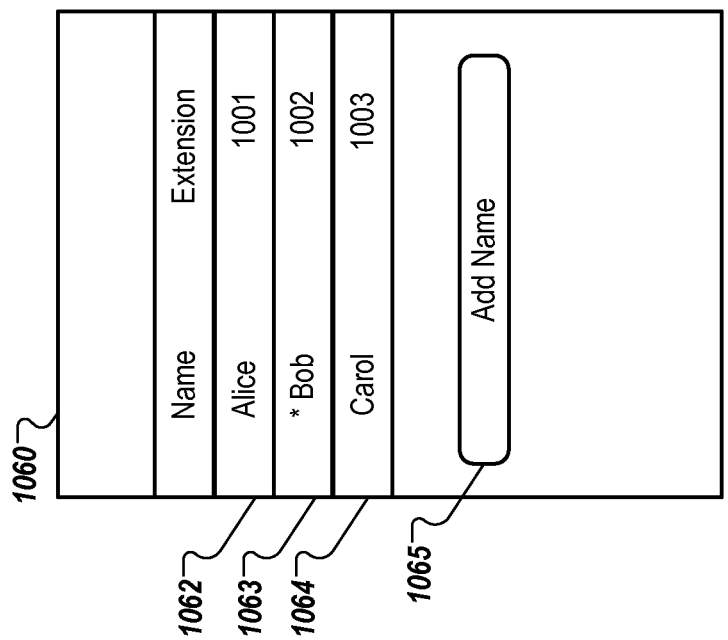

FIG. 10A-10C show example administrative screens of a BLA group. In FIG. 10A, a user with administrative privileges can add mobile devices or landline devices to a BLA group. In this example, Alice's mobile device with serial number 12345 is added to the BLA group. Mobile device 12345 can have two lines, each line can have a direct number, and an extension number. An extension number can match the last four digits of a direct number, e.g., extension number 1234 reach the same device as direct number 800 555 1234. An extension number can alternatively be independent of the numerical value of a main number (e.g., it is permissible for extension number 1000 to reach the same device as direct number 800 555 1234).

An administrator can edit devices on a display device by adding phone numbers in column 1010, adding devices in device column 1020, editing details of a device (e.g., configuring whether the device is a primary line device, editing a display name for the device, etc.) by selecting "Edit" in the details column 1030. An administrator can manage call plans for each device in a plan column 1040, or change extension numbers for a device in extension column 1050. An administrator can also access a mobile device's location and action rule database to view or edit the mobile device's location and action rules by selecting the "Edit" links in location column 1060. The editing screen in FIG. 10 can be used in addition to other user interfaces to assist the managing of a BLA group. A database on the vPBX server can have a table with data columns corresponding to columns 1010, 1020, 1030, 1040, 1050, and 1060. The database can also have additional data columns to serve as a backend of a group management user interface.

FIGS. 10B and 10C illustrate administrative display screens on a mobile device. In FIG. 10B, a display screen 1060 on a mobile device lists members of a BLA group by user name and extension. A BLA group administrator can view display screen 1060 after being authenticated by a vPBX system. The authentication can be based on a received input of user name, password, location, time, or any combination of the inputs. Display screen 1060 can be configured to receive touch-screen input, such as tapping, double tapping, and multi-fingering. For example, in a BLA group that includes three users Alice, Bob, and Carol, the administrator can see three rows 1062, 1063, and 1064 on display screen 1060, each of the three rows displaying a user name and an extension number. In row 1063, the name Bob is preceded with an asterisk, which can indicate that Bob is a monitoring user, and extension 1002 is a primary phone number. Other indicators are possible to show that Bob is a monitoring user. For example, row 1063 can have a grey scale or color that differs from other rows 1062 and 1064. An administrator can add a user to the group by tapping "Add Name" button 1065. An add user screen can be displayed to add a new user.

Each row 1062, 1063, and 1064 can be tapped to enter an editing display. For example, by tapping row 1062, a BLA group administrator can enter an editing screen 1070 to configure an extension for Alice. FIG. 10C illustrates the editing screen 1070 for user Alice. Editing 1070 has an indicator row 1072 that indicates that user Alice at extension 1001 is being accessed. Through editing screen 1070, an administrator can perform various tasks to change Alice's settings. For example, an administrator can tap button 1073 to access device details for Alice. The administrator can change device, add device, and delete device that are associated with Alice and extension 1001. An administrator can tap button 1074 to view, create, edit, or delete call plans for Alice. An administrator can tap button 1075 to view, create, edit, or delete location based rules for Alice. An administrator can tap button 1076 to view, edit, or delete Alice's membership in a BLA group.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a mobile device to perform a certain activity or bring about a certain result. A computer program can be written in any form of programming language (e.g., C++, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of mobile device. Generally, a processor will receive instructions and data from a read-only memory or a random access memory or both. The essential elements of a mobile device are a processor for executing instructions and one or more memories for storing instructions and data. Generally, a mobile device can also include, or be operatively coupled to communicate with, one or more mass storage devices for storing data files; such devices include magnetic disks, such as internal hard disks and removable disks; magneto-optical disks; and optical disks, flash memory cards, etc. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a mobile device having a display device such as LCD (liquid crystal display) screen or a touch-sensitive screen for displaying information to the user, a keyboard or a touch-screen input device, a pointing device such as navigation buttons, track balls, or touch-screen point device, and a voice command input device by which the user can provide input to the mobile device. While reference has been made above to input by tapping or other touch methods, other forms of user input are possible.

The features can be implemented in a mobile device that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet and voice and data network.

A number of implementations have been described. Nevertheless, it will be understood that various modifications can be made without departing from the spirit and scope of the invention. For example, example users Alice and Bob are used. However, the described features are not limited to two users. For another example, many controls, menus, and keys are omitted from the example display screens. However, it will be understood that the absence of illustrations of the controls, menus, and keys requires the absence of the actual controls, menus, and keys. Accordingly, other implementations are within the scope of the following claims.

What is claimed is:

1. A method comprising:
   identifying a bridged-line group, the bridged-line group including a first user associated with a first mobile device and a second user associated with a second mobile device;
   generating a rule for designating the first user as a monitoring user for the bridged-line group, wherein the monitoring user is a user that can intercept and answer calls directed to other users in the bridged-line group, and wherein the rule specifies that:
   (i) the first user is designated as the monitoring user for the bridged-line group when a current location of the first mobile device matches any of one or more locations for the first user, and
   (ii) the first user is not designated as the monitoring user for the bridged-line group when the current location of the first mobile device does not match any of the one or more location for the first user;
   receiving a call intended for the second user;
   determining a location of the first mobile device associated with the first user;
   determining that the first user is currently designated as the monitoring user for the bridged-line group based at least in part on determining that the location of the first mobile device matches one of the one or more locations specified in the rule for designating the first user as the monitoring user for the bridged-line group; and
   in response to determining that the first user is currently designated as the monitoring user, routing the call intended for the second user to the first user at the first mobile device.

2. The method of claim 1, wherein routing the call to the first user is performed based on determining that the second user has given prior permission for the first user to handle calls intended for the second user while the first user is designated as the monitoring user.

3. The method of claim 1, wherein designating the first user as the monitoring user comprises:
   enabling the first user to redirect the routed call to the second mobile device based on a call status of the second user.

4. The method of claim 3, wherein designating the first user as the monitoring user comprises:
   enabling the first user to barge in on an on-going conversation between the second user and a caller of the call after the routed call is redirected.

5. The method of claim 1, wherein designating the first user as the monitoring user comprises:
   enabling the second user to view a call status of the first user when the call intended for the second user is routed to the first user.

6. The method of claim 1, further comprising:
   prior to routing the call intended for the second user to the first user, determining a call status of the second user.

7. The method of claim 6, wherein routing the call intended for the second user to the first user at the first mobile device further comprises routing the call intended for the second user to the first user at the first mobile device based at least in part on the call status of the second user.

8. The method of claim 6, wherein determining the call status of the second user comprises determining the call status based on at least one of a location-based availability status of the second user or a line status associated with the second user.

9. The method of claim 1, further comprising providing, for display in a user interface of the first mobile device, information identifying a location-based availability status of the second user, wherein the location-based availability status of the second user is based at least in part on a location of the second mobile device associated with the second user.

10. A system comprising one or more computers and one or more storage devices storing instructions that when executed by the one or more computers cause the one or more computers to perform operations comprising:
    identifying a bridged-line group, the bridged-line group including a first user associated with a first mobile device and a second user associated with a second mobile device;
    generating a rule for designating the first user as a monitoring user for the bridged-line group, wherein the monitoring user is a user that can intercept and answer calls directed to other users in the bridged-line group, and wherein the rule specifies that:
    (i) the first user is designated as the monitoring user for the bridged-line group when a current location of the first mobile device matches any of one or more locations for the first user, and
    (ii) the first user is not designated as the monitoring user for the bridged-line group when the current location of the first mobile device does not match any of the one or more location for the first user;
    receiving a call intended for the second user;
    determining a location of the first mobile device associated with the first user;
    determining that the first user is currently designated as the monitoring user for the bridged-line group based at least in part on determining that the location of the first mobile device matches one of the one or more locations specified in the rule for designating the first user as the monitoring user for the bridged-line group; and
    in response to determining that the first user is currently designated as the monitoring user, routing the call intended for the second user to the first user at the first mobile device.

11. The system of claim 10, wherein designating the first user as the monitoring user comprises:
    enabling the second user to view a call status of the first user when the call intended for the second user is routed to the first user.

12. The system of claim 10, the operations further comprising:
    prior to routing the call intended for the second user to the first user, determining a call status of the second user.

13. The system of claim 12, wherein routing the call intended for the second user to the first user at the first mobile device further comprises routing the call intended for the second user to the first user at the first mobile device based at least in part on the call status of the second user.

14. The system of claim 12, wherein determining the call status of the second user comprises determining the call status based on at least one of a location-based availability status of the second user or a line status associated with the second user.

15. The system of claim 10, the operations further comprising providing, for display in a user interface of the first mobile device, information identifying a location-based availability status of the second user, wherein the location-based availability status of the second user is based at least in part on a location of the second mobile device associated with the second user.

16. A non-transitory computer storage medium encoded with a computer program, the computer program comprising instructions that when executed by one or more computers cause the one or more computers to perform operations comprising:
- identifying a bridged-line group, the bridged-line group including a first user associated with a first mobile device and a second user associated with a second mobile device;
- generating a rule for designating the first user as a monitoring user for the bridged-line group, wherein the monitoring user is a user that can intercept and answer calls directed to other users in the bridged-line group, and wherein the rule specifies that:
  - (i) the first user is designated as the monitoring user for the bridged-line group when a current location of the first mobile device matches any of one or more locations for the first user, and
  - (ii) the first user is not designated as the monitoring user for the bridged-line group when the current location of the first mobile device does not match any of the one or more location for the first user;
- receiving a call intended for the second user;
- determining a location of the first mobile device associated with the first user;
- determining that the first user is currently designated as the monitoring user for the bridged-line group based at least in part on determining that the location of the first mobile device matches one of the one or more locations specified in the rule for designating the first user as the monitoring user for the bridged-line group; and
- in response to determining that the first user is currently designated as the monitoring user, routing the call intended for the second user to the first user at the first mobile device.

* * * * *